(12) United States Patent
Morcov et al.

(10) Patent No.: US 7,369,417 B2
(45) Date of Patent: May 6, 2008

(54) METHOD AND SYSTEM FOR PRODUCING CONTROLLED FREQUENCY POWER FROM A VARIABLE FREQUENCY POWER SOURCE

(75) Inventors: Nicolae A. Morcov, Mississauga (CA); Cristian E. Anghel, Mississauga (CA)

(73) Assignee: Honeywell International, Inc., Morristown, NJ (US)

( * ) Notice: Subject to any disclaimer, the term of this patent is extended or adjusted under 35 U.S.C. 154(b) by 295 days.

(21) Appl. No.: 10/996,678

(22) Filed: Nov. 24, 2004

(65) Prior Publication Data

US 2006/0109701 A1   May 25, 2006

(51) Int. Cl.
*H02M 5/458* (2006.01)
(52) U.S. Cl. ............................................ 363/3; 363/37
(58) Field of Classification Search .................... 363/2, 363/3, 5, 8, 9, 10, 34, 36, 37
See application file for complete search history.

(56) References Cited

U.S. PATENT DOCUMENTS

| | | | |
|---|---|---|---|
| 4,038,592 A | 7/1977 | Stummer | |
| 4,587,436 A | 5/1986 | Cronin | |
| 4,967,334 A | 10/1990 | Cook et al. | |
| 4,996,646 A | 2/1991 | Farrington | |
| 5,013,929 A | 5/1991 | Dhyanchand | |
| 5,387,859 A * | 2/1995 | Murugan et al. | 322/10 |
| 5,694,307 A | 12/1997 | Murugan | |
| 5,737,196 A * | 4/1998 | Hughes et al. | 363/8 |
| 5,824,990 A | 10/1998 | Geissler et al. | |
| 6,018,233 A | 1/2000 | Glennon | |
| 6,052,292 A | 4/2000 | Podlesak | |
| 6,188,139 B1 * | 2/2001 | Thaxton et al. | 290/4 R |
| 6,487,096 B1 | 11/2002 | Gilbreth et al. | |
| 6,501,194 B1 | 12/2002 | Jiang et al. | |
| 6,600,240 B2 | 7/2003 | Mikhail et al. | |
| 2002/0001205 A1 | 1/2002 | Bucks et al. | |
| 2002/0190697 A1 | 12/2002 | Ferens et al. | |

FOREIGN PATENT DOCUMENTS

EP          1 022 218 A2     7/2000

* cited by examiner

*Primary Examiner*—Jeffrey Sterrett
(74) *Attorney, Agent, or Firm*—Oral Caglar, Esq.

(57) ABSTRACT

A circuit producing power with controlled frequency from a variable frequency power source (14) includes an AC bus (20) connected to the variable frequency power source (14) and a plurality of load circuits, each load circuit including an AC input (24) and an AC output (26), an AC contactor (30) between the input (24) and output (26), a rectifier (32) between the AC contactor (30) and the output (26) and an inverter (34) between the rectifier (32) and the output (26). A method of producing power with controlled frequency is also disclosed.

16 Claims, 3 Drawing Sheets

METHOD AND SYSTEM FOR PRODUCING CONTROLLED FREQUENCY POWER FROM A VARIABLE FREQUENCY POWER SOURCE

FIELD OF THE INVENTION

The present invention is directed toward a method and system for producing power having a controlled frequency from a variable frequency power source, and, more specifically, toward a method and system for producing power having a controlled frequency from a variable frequency power source that operates without DC contactors.

BACKGROUND OF THE INVENTION

Variable frequency power supplies are generally driven by a variable speed input. Such power supplies may be found, for example, on aircraft which have generators powered by turbine engines that operate over a wide speed range. The frequency of the power provided varies with the operating speed of the turbine. Some loads function adequately with variable frequency power; for other loads, power with controlled frequency is necessary or preferable.

Various methods are known for producing power with controlled or constant frequency from a variable speed generator. In such systems, variable frequency power is rectified and then input to an inverter which produces an output the frequency of which can be controlled. FIG. 1 illustrates a conventional system for converting variable frequency power to power with a controlled frequency. This system includes a variable frequency generator 200 connected to a power source such as turbine engine 201, an AC bus 202, a pair of autotransformers 204 connected to the AC bus 202, a pair of rectifiers 206 each having an input receiving multiphase power from transformers 204 and an output connected to a DC bus 208. A plurality of load circuits 210 are connected to DC bus 208. Each load circuit 210 includes an inverter 212, a DC contactor 214 isolating the inverter 212 from the DC bus, and an AC output 218. These load circuits often have low impedance, and therefore resonance between inverters can develop. It is therefore generally desirable to provide separation diodes 216 in the load circuits to isolate the load circuits from one another and minimize resonance.

Such systems work reasonably well for their intended purpose. However, DC contactors tend to be large and expensive and may fail before other elements of the circuit in which they are used. Moreover, the need for separation diodes adds to the complexity and expense of the such systems. It is therefore desirable to provide a method and system for providing power with controlled frequency from a variable frequency power source that reduces the need for DC contactors and separation diodes.

SUMMARY OF THE INVENTION

These problems and others are addressed by the present invention which comprises, in a first aspect, a method of producing power with controlled frequency from a variable frequency power source that involves connecting an AC bus to a variable frequency power source and providing a plurality of load circuits. Each of the load circuits includes an AC input, an AC output, an AC contactor between the input and output, a rectifier between the AC contactor and the output and an inverter between the rectifier and the output. The inputs of the load circuits are connected to the AC bus.

Another aspect of the invention comprises a circuit producing power with controlled frequency from a variable frequency power source which includes an AC bus connected to the variable frequency power source and a plurality of load circuits. Each of the load circuits includes an AC input and an AC output, an AC contactor between the input and output, a rectifier between the AC contactor and the output and an inverter between the rectifier and the output.

A further aspect of the invention comprises a circuit that includes an AC bus, a variable frequency generator connected to the AC bus, a plurality of lines connected to the AC bus for connecting a plurality of loads to the AC bus, an inverter including rectifying diodes in each of the plurality of lines and an AC contactor in each of the plurality of lines between the AC bus and the inverter in each of the plurality of lines.

Another aspect of the invention comprises a method of providing power with controlled frequency using a multiphase variable frequency power source that involves supplying variable frequency power having at least 12 phases to an AC bus and connecting a plurality of load circuits to the AC bus, each load circuit having an output, an AC contactor, a rectifier and an inverter in series between the AC bus and the output. Power is then drawn from at least one of the load circuits.

An additional aspect of the invention comprises an aircraft comprising a turbine engine, a plurality of electrical loads, and a power system connecting the turbine engine to each of the plurality of loads, where the power system includes a main AC bus, a variable frequency generator connected between the turbine engine and the main AC bus and first and second transformers connected to the main AC bus. Furthermore, a first additional AC bus is connected to the first transformer, and a second additional AC bus is connected to the second transformer. A first plurality of load circuits is connected to the first additional AC bus, each having an AC input connected to the first additional AC bus and an AC output. Each of the plurality of load circuits comprises a rectifier and an inverter between the first additional AC bus and the output and an AC contactor between the first additional AC bus and the rectifier.

BRIEF DESCRIPTION OF THE DRAWINGS

These aspects and others will be better understood after a reading of the following detailed description together with the following drawings wherein.

DETAILED DESCRIPTION

Figure 1:
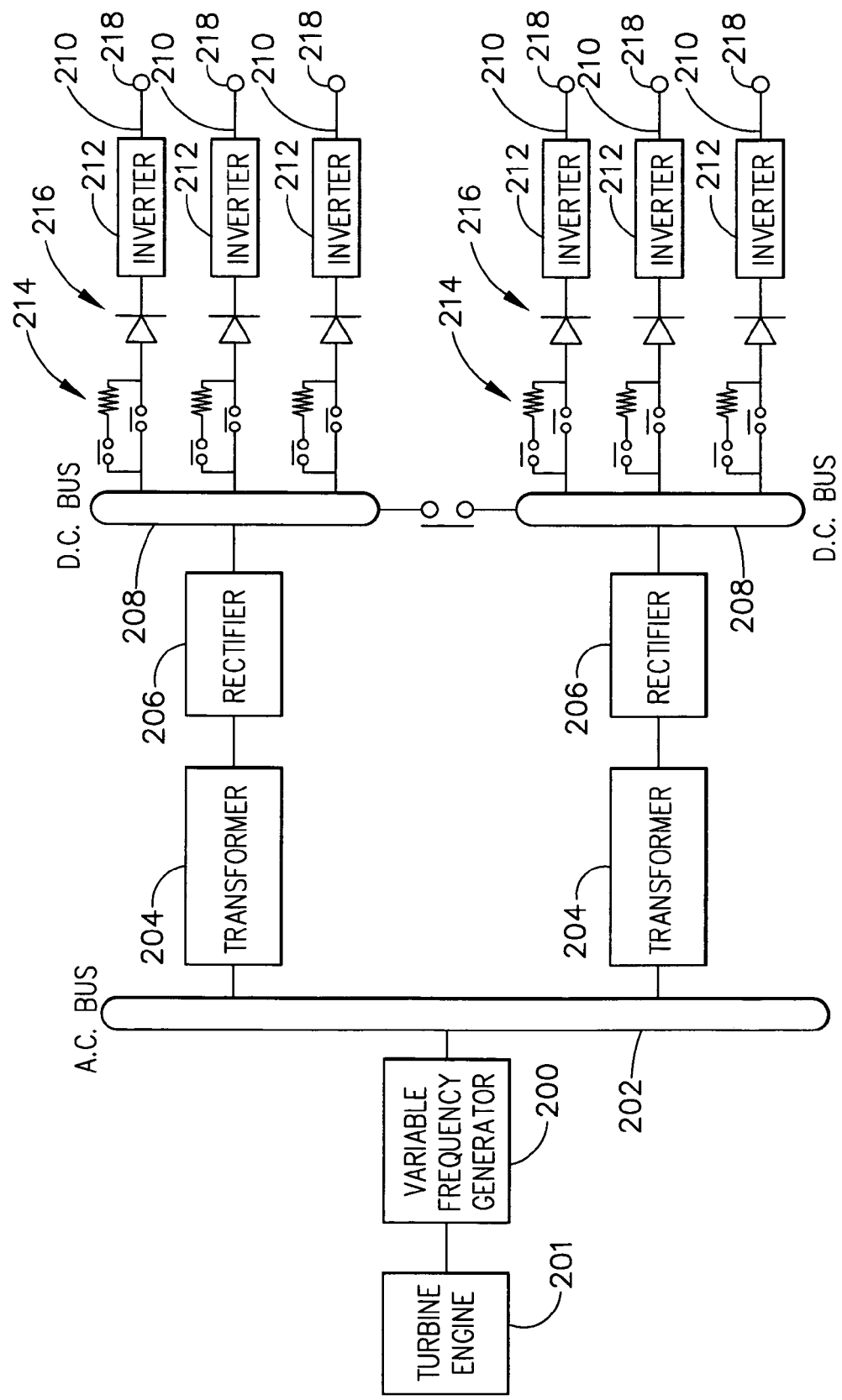
FIG. 1 schematically illustrates a conventional circuit for producing AC power with controlled frequency from a variable frequency power source.
Figure 2:
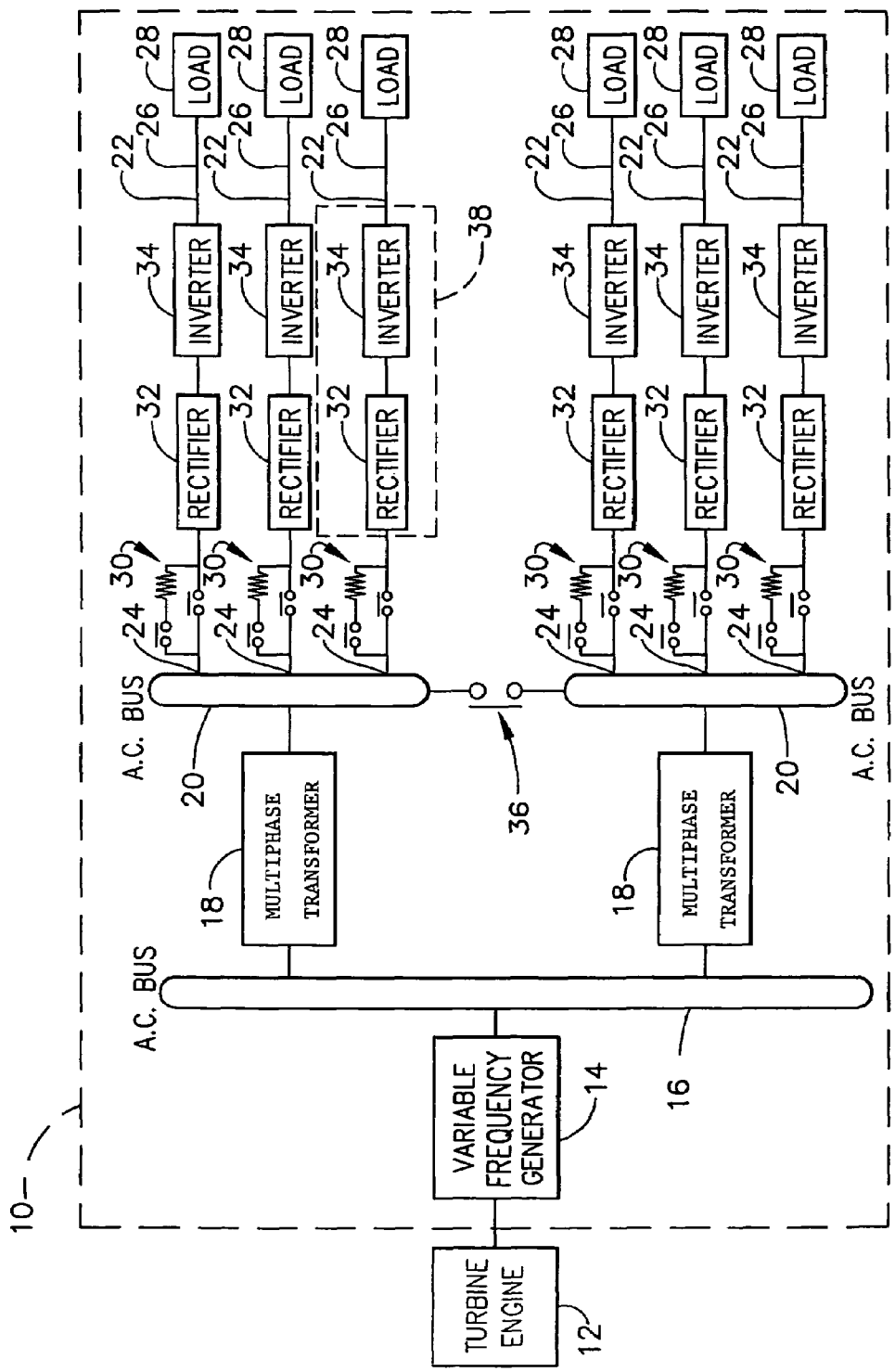
FIG. 2 schematically illustrates a circuit for producing AC power with controlled frequency from a variable frequency power source according to an embodiment of the present invention.
Figure 3:
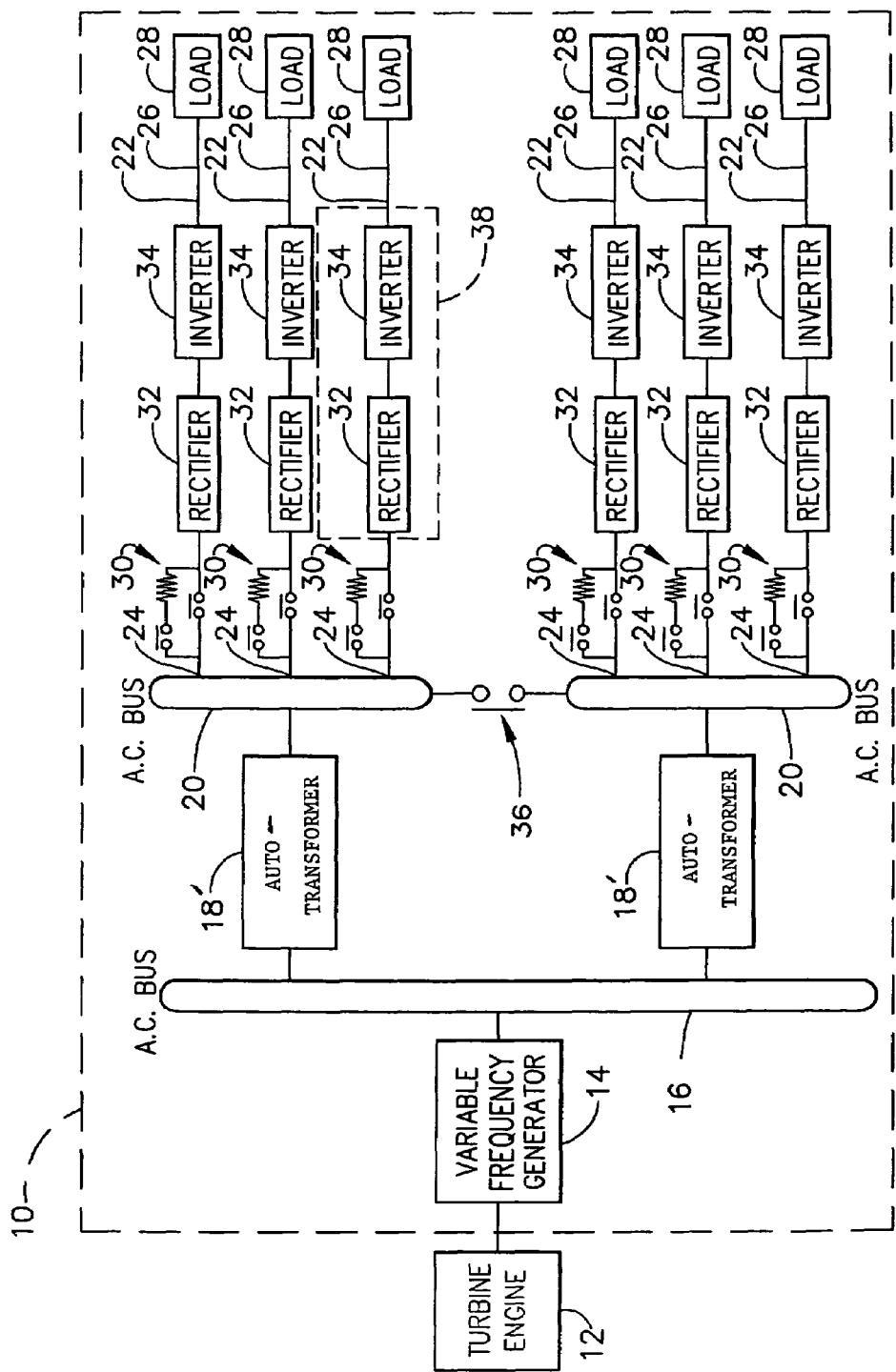
FIG. 3 schematically illustrates a variation of the circuit of FIG. 2.

Referring now to the drawings, wherein the showings are for the purpose of illustrating embodiments of the invention only and not for the purpose of limiting same, FIG. 2 illustrates an aircraft 10 having a turbine engine 12 powering a variable frequency generator 14 which provides power to a first or main AC bus 16. A pair of transformers 18, which may comprise autotransformers 18' as illustrated in FIG. 3, are connected to first AC bus 16 and are adapted to output power having an equal or greater number of phases than the power input thereto. For example, if variable frequency generator 14 produces a typical three-phase output, transformers 18 will provide a 3, 6, 9, 12, 18 or 24 phase output. Increasing the number of phases will reduce ripple in the output of any rectifier connected to the first AC bus 16. To each of the transformers 18 is attached an additional AC bus 20, and one or more load circuits 22 are connected to each additional AC bus 20. The load circuits 22 each comprise an input 24, an output 26 connectable to a load 28, an AC contactor 30, a rectifier 32 between AC contactor 30 and output 26 and an inverter 34 between AC contactor 30 and output 26. Rectifier 32 may advantageously comprise a full wave rectifier. And, as illustrated by dashed line 38 in FIG. 2, rectifier 32 and inverter 34 may be integrally formed. An additional contactor 36 may be provided between the AC busses 24 to selectively connect the busses and provide redundancy.

In operation, turbine engine 12 turns to drive variable frequency generator 14 which supplies power to first AC bus 16. Each transformer 18 receives, for example, three phase power from transformer 18 and outputs power having, for example, 9 phases. Each of the load circuits 22 is supplied with AC power from the additional AC bus 20. Because the load circuits 22 are supplied with AC power, the load circuits 22 can include AC contactors 30 which are generally more reliable and less expensive that the DC contactors that were used in conventional systems. The rectifiers 32 used in each load circuit are also smaller than the rectifiers 200 used in conventional systems; therefore, even though a greater number of rectifiers is used in this arrangement, the overall system cost and weight is less than that of a conventional system, and the system is generally more reliable.

The present invention has been described in terms of a preferred embodiment. Obvious modifications and additions to this embodiment will become apparent to those skilled in the art and are intended to comprise a part of the present invention to the extent they fall within the scope of the several claims appended hereto.

We claim:

1. A method of producing power with controlled frequency from a variable frequency power source comprising the steps of:
    connecting an AC bus to the variable frequency power source;
    connecting a multiphase transformer between the variable frequency power source and the AC bus, inputting variable frequency power having a first number of phases to the multiphase transformer and outputting to the AC bus variable frequency power having more than said first number of phases; and
    connecting to the AC bus a plurality of circuits each having:
    a rectifier having an input electrically connected to the AC bus and having an output;
    an inverter having an input electrically connected to the rectifier output and having an output;
    a load connected to the output of the inverter; and
    an AC contactor connected between the rectifier and the AC bus, and
    providing current from the AC bus to each of the plurality of circuits.

2. The method of claim 1 wherein the first number is three.

3. An aircraft comprising a turbine engine, a plurality of electrical loads, and a power system connecting said turbine engine to each of said plurality of loads, said power system comprising:
    a main AC bus:
    a variable frequency generator connected between said turbine engine and said main AC bus;
    first and second transformers connected to said main AC bus;
    a first additional AC bus connected to said first transformer and a second additional AC bus connected to said second transformer;
    a first plurality of circuits connected to said first additional AC bus, each of said first plurality of circuits comprising a rectifier having an input electrically connected to said first additional AC bus and having an output, an inverter having an input electrically connected to the output of the rectifier and having an output, a load connected to the output of the inverter and a first AC contactor electrically connected between the rectifier and the first additional AC bus, and
    a second plurality of circuits connected to said second additional AC bus, each of said second plurality of circuits comprising a rectifier having an input electrically connected to said second additional AC bus and having an output, an inverter having an input electrically connected to the output of the rectifier and having an output, a load electrically connected to the output of the inverter and a first AC contactor electrically connected between the second additional AC bus and the rectifier.

4. The aircraft of claim 3 wherein said first transformer is configured to receive power having a first number of phases and to output power having a second number of phases, said second number being greater than said first number.

5. The aircraft of claim 4 wherein said transformer comprises an autotransformer.

6. The aircraft of claim 3 wherein said second transformer is configured to receive power having a first number of phases and to output power having a second number of phases, said second number being greater than said first number.

7. The aircraft of claim 6 wherein said first transformer or said second transformer or both said first and second transformers comprise an autotransformer.

8. The aircraft of claim 3 including a second AC contactor connecting said first additional AC bus and said second additional AC bus.

9. A circuit producing power with controlled frequency from a variable frequency power source comprising:
    an AC bus connected to the variable frequency power source;
    a multiphase transformer connected between the variable frequency power source and the AC bus, said transformer being configured to receive power having a first number of phases from the power source and to output power having a second number of phases, said second number being greater than said first number; and
    a plurality of circuits receiving current from the AC bus, each circuit having: a rectifier having an input electrically connected to the AC bus and an output, an inverter having an input electrically connected to the output of the rectifier and having an output, a load connected to the output of the inverter and an AC contactor electrically connected between the rectifier and the AC bus.

10. The circuit of claim 9 wherein said first number is three and said second number is 12.

11. The circuit of claim 9 wherein said first number is three and said second number is 18.

12. The circuit of claim 9 wherein said first number is three and said second number is 24.

13. The circuit of claim 9 including an autotransformer connected between the variable frequency power source and the AC bus.

14. The circuit of claim 9 wherein the inverter and rectifier in at least one of said circuits are integrally formed.

15. The circuit of claim 9 wherein said first number is three and said second number is 6.

16. The circuit of claim 9 wherein said first number is three and said second number is 9.

* * * * *